US009726344B2

(12) United States Patent
Liao et al.

(10) Patent No.: US 9,726,344 B2
(45) Date of Patent: Aug. 8, 2017

(54) LENS AND LIGHT EMITTING DEVICE HAVING THE SAME

(71) Applicant: ADVANCED OPTOELECTRONIC TECHNOLOGY, INC., Hsinchu, Hsien (TW)

(72) Inventors: Cheng-Chun Liao, Hsinchu (TW); Hao-Xiang Lin, Hsinchu (TW); Chung-Min Chang, Hsinchu (TW); Chih-Peng Hsu, Hsinchu (TW)

(73) Assignee: ADVANCED OPTOELECTRONIC TECHNOLOGY, INC., Hsinchu Hsien (TW)

( * ) Notice: Subject to any disclaimer, the term of this patent is extended or adjusted under 35 U.S.C. 154(b) by 88 days.

(21) Appl. No.: 14/814,675

(22) Filed: Jul. 31, 2015

(65) Prior Publication Data

US 2016/0061408 A1    Mar. 3, 2016

(30) Foreign Application Priority Data

Sep. 3, 2014  (CN) .......................... 2014 1 0444971

(51) Int. Cl.
*F21V 5/04*  (2006.01)
*G02B 19/00* (2006.01)

(52) U.S. Cl.
CPC ............ *F21V 5/04* (2013.01); *G02B 19/0047* (2013.01)

(58) Field of Classification Search
CPC ............................. F21V 5/04; G02B 19/0047
See application file for complete search history.

(56) References Cited

U.S. PATENT DOCUMENTS

2012/0320102 A1*   12/2012   Jorgensen ............. F21S 10/007
345/690

FOREIGN PATENT DOCUMENTS

CN           102192472 A       9/2011

* cited by examiner

*Primary Examiner* — Thomas M Sember
(74) *Attorney, Agent, or Firm* — Steven Reiss (57) ABSTRACT

A lens includes a substrate, a light concentrating portion mounted on the substrate. The substrate includes a first substrate and a second substrate, the light concentrating portion includes a first light concentrating portion and a second light concentrating portion. The first light concentrating portion extends outward from the first substrate, the second light concentrating portion extends outward from the second substrate. The first light concentrating portion has a first axis, the second light concentrating portion has a second axis. The first axis and the second axis are configured in an angle and intersect in an extending direction thereof.

12 Claims, 9 Drawing Sheets

LENS AND LIGHT EMITTING DEVICE HAVING THE SAME

CROSS-REFERENCE TO RELATED APPLICATIONS

This application claims priority to Chinese Patent Application No. 201410444971.5 filed on Sep. 3, 2014, the contents of which are incorporated by reference herein.

FIELD

The subject matter herein generally relates to a lens, especially relates to a light emitting device having the lens.

BACKGROUND

Traditional light emitting device includes a substrate, a light source mounted on the substrate and a reflective cup mounted on the substrate and around the light source. Light emitted from the light source is reflected by the reflective cup to exit. However, the reflective cup reflects the light source is limited in a scope, the light reflected by the reflective cup is not gathered enough.

BRIEF DESCRIPTION OF THE DRAWINGS

Implementations of the present technology will now be described, by way of example only, with reference to the attached figures.

DETAILED DESCRIPTION OF EMBODIMENTS

It will be appreciated that for simplicity and clarity of illustration, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure. The description is not to be considered as limiting the scope of the embodiments described herein.

Several definitions that apply throughout this disclosure will now be presented. The term "comprising" means "including, but not necessarily limited to"; it specifically indicates open-ended inclusion or membership in a so-described combination, group, series and the like.

Figure 1:
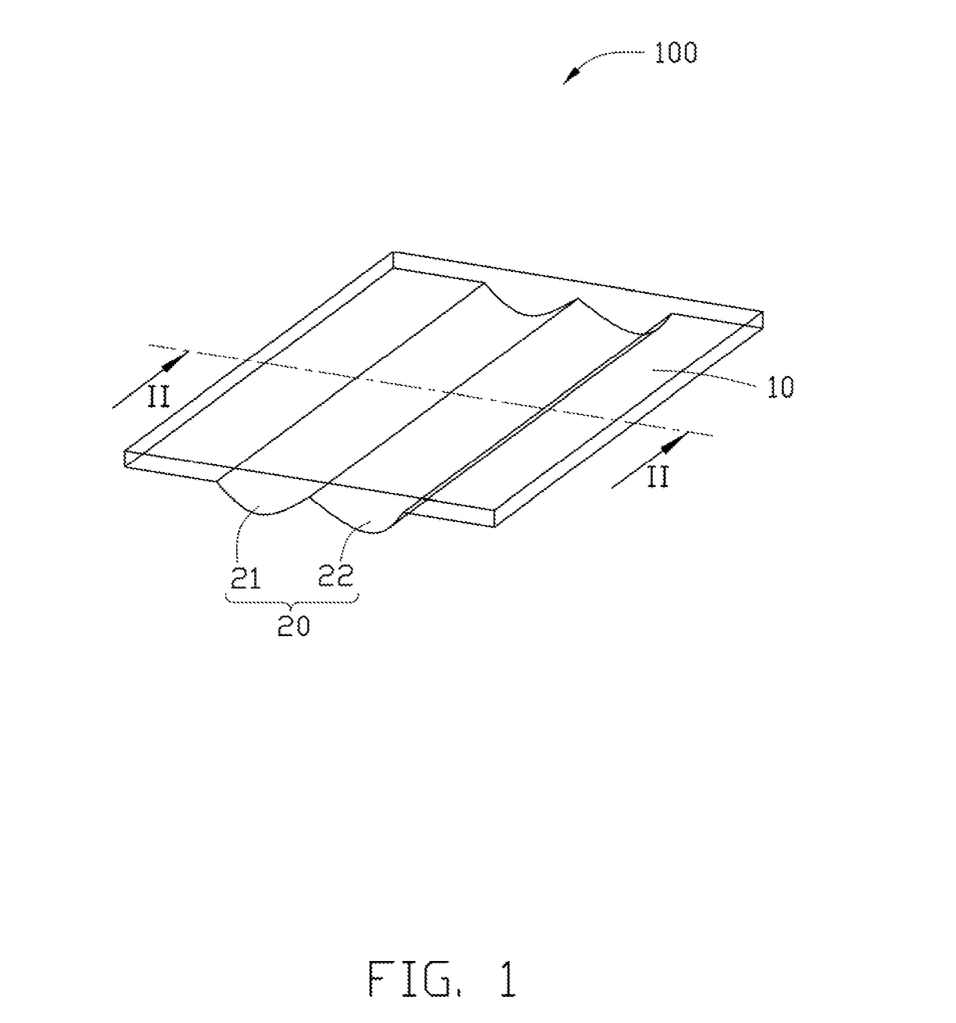
FIG. 1 is an isometric view of a lens of a first embodiment of the present disclosure.

As illustrate in FIG. 1, a lens 100 of a first embodiment of the present disclosure includes a substrate 10 and a light concentrating portion 20 mounted on a side of the substrate 10. The light concentrating portion 20 includes a first light concentrating portion 21 and a second light concentrating portion 22.

Figure 2:
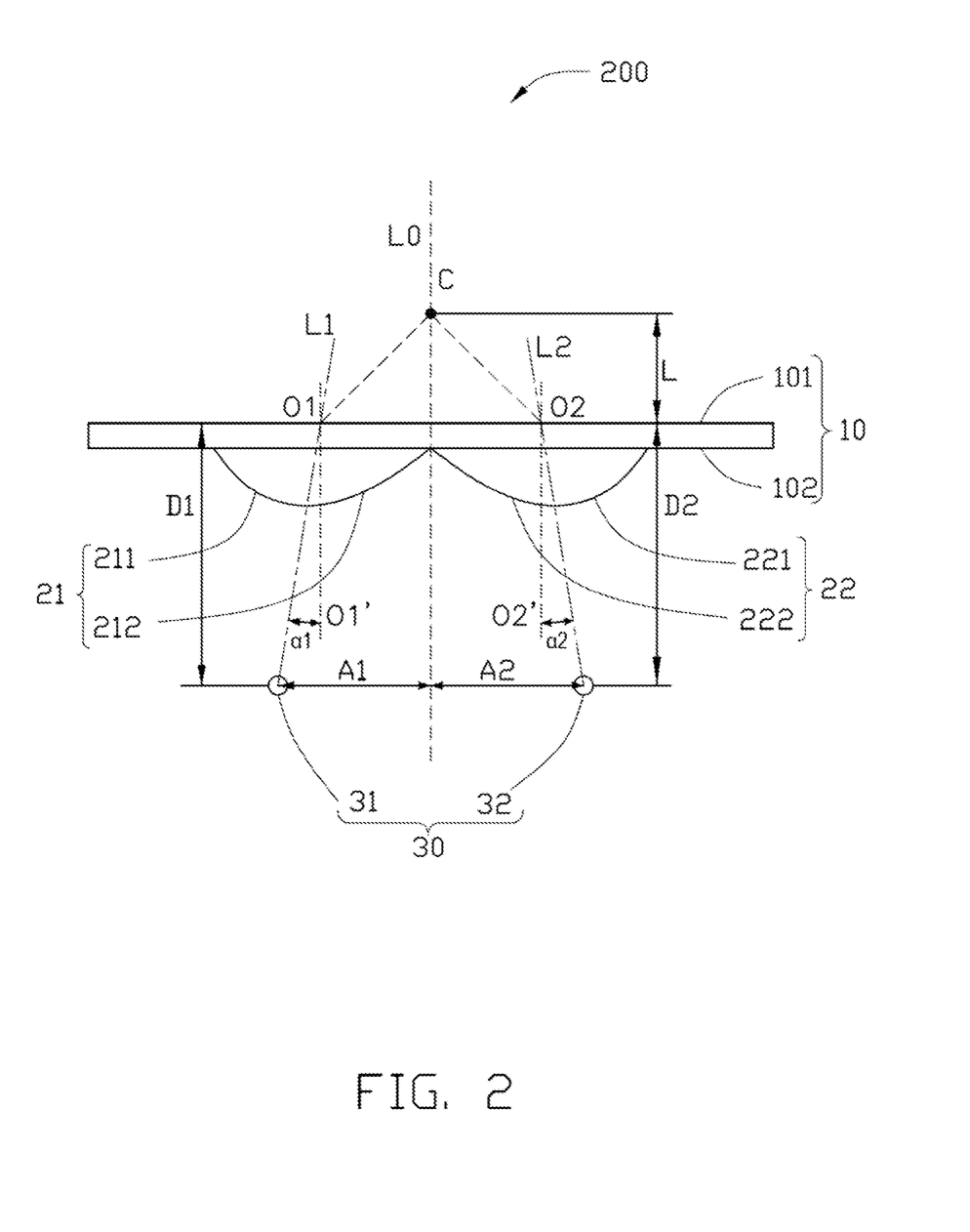
FIG. 2 is a diagrammatic view of a light emitting device having the lens of a first embodiment, and the lens is broken taken along II-II line of FIG. 1.

Also referring to FIG. 2, the first light concentrating portion 21 has a first axis L1, and the second light concentrating portion 22 has a second axis L2. The first axis L1 and the second axis L2 are configured in an angle and intersect in an extending direction thereof.

The lens 100 is made of material with high light transmission, such as polymethl methacrylate, Polycarbonate, etc. In this embodiment, the substrate 10 and the light concentrating portion 20 are made of one single piece.

The substrate 10 is a rectangular plate and includes a first side 101 and a second side 102 located opposite to the first side 101. The first side 101 and the second side 102 are smooth side.

The first concentrating portion 21 extends outwardly from the second side 102 of the substrate 10. The first concentrating portion 21 includes a first curved surface 211 and a second curved surface 212 located at opposite sides of the first axis L1. In this embodiment, the first curved surface 211 is located at a left side of the first axis L1, and the second curved surface 212 is located at a right side of the first axis L1. The curvature of the first curved surface 211 is different from that of the second curved surface 212. The curvature of the first curved surface 211 is more than that of the second curved surface 212. The firs axis L1 of the first concentrating portion 21 and an imaginary line O1-O1' perpendicularly to the first side 101 of the substrate 10 define a angle $\alpha 1$. The angle $\alpha 1$ is smaller than 90°.

The second concentrating portion 22 is located at a side of the first concentrating portion 21 and extends outwardly from the second side 102 of the substrate 10. In this embodiment, the second concentrating portion 22 is on the right of the first concentrating portion 21, and the second concentrating portion 22 and the first concentrating portion 21 are extended towards the same direction. The second concentrating portion 22 includes a first curved surface 221 and a second curved surface 222 located at opposite sides of the second axis L2. In illustrated embodiment, the first curved surface 221 is located at a right of the second axis L2, the second curved surface 222 is located at a left of the second axis L2. Specifically, the second curved surface 222 of the second concentrating portion 22 and the second curved surface 212 of the first concentrating portion 21 are located between the first curved surface 221 of the second concentrating portion 22 and the first curved surface 211 of the first concentrating surface 21. The curvature of the first curved surface 221 of the second concentrating portion 22 is more than that of the second curved surface 222 of the second concentrating portion 22. The second axis L2 and a imaginary line O2-O2' perpendicularly to the second side 102 of the substrate 10 define an angle $\alpha 2$. The angle $\alpha 2$ is similar than 90°.

In the illustrated embodiment, light along the first axis L1 and light along the second axis L2 is through the lens 100 and gathers to form a light spot C above the first side 101 of the substrate 10.

As illustrated in FIG. 2, a light emitting device 200 includes the lens 100 and a light source 30 below the lens 100.

The light source 30 includes a first light source 31 and second light source 32 spaced from the first light source 31. The first light source 31 is located at the first axis L1 and corresponding with the first light concentrating portion 21. The second light source 32 is located at the second axis L2 and corresponding with the second light concentrating portion 22. Specifically, in the illustrated embodiment, the luminescence center of the first light source 31 is located at the first axis L1, the luminescence center of the second light source 32 is located at the second axis L2.

In the illustrated embodiment, the first light source 31 and the second light source 32 are light emitting diodes. The light emitted from the first light source 31 and the light emitted from the second light source 32 respectively enters the lens 100 along the first axis L1 of the first light concentrating portion 21 and the second axis L2 of the second light concentrating portion 22 to gather at the light spot C. The light spot C has a highest light intensity.

In the light emitting device 200, light emitted from the first light source 31 and along the first axis L1, and the imaginary line O1-O1' defines the angle α1. Light emitted from the second light source 32 and along the second axis L2, and the imaginary line O2-O2' define the angle α2. A vertical distance between the luminescence center of the first light source 31 and the first side 101 of the substrate 10 is D1. A vertical distance defined between the luminescence center of the second light source 32 and the first side 101 of the substrate 10 is D2. A line L0 is defined through the center light spot C and perpendicularly to the first side 101 of the substrate 10. A vertical distance between the luminescence center of the first light source 31 and the line L0 is A1. A vertical distance between the luminescence center of the second light source 32 and the line L0 is A2. A vertical distance between the center of the light spot C and the first side 101 of the substrate 10 is L. The reflective index of the lens 100 is N. So light emitted from the first light source 31 along the first axis L1 and light emitted from the second light source 32 along the second axis L2 satisfies the following relations:

$$D1*\operatorname{Tan}(\alpha 1)+L*\operatorname{Tan}(\operatorname{Sin}-1(N*\operatorname{Sin}(\alpha 1)))=A1 \quad (1)$$

$$D2*\operatorname{Tan}(\alpha 2)+L*\operatorname{Tan}(\operatorname{Sin}-1(N*\operatorname{Sin}(\alpha 2)))=A2 \quad (2)$$

The equation (1), (2) describes the light emitted from the first light source 31 along the first axis L1 and the light emitted from the second light source along the second axis L2 to enter the lens 100.

The light emitted from the first light source 31 around the first axis L1 and the light emitted from the second light source 32 around the second axis L2 is described to be introduced a parameter δ. So the above equation (1), (2) are newly described as following:

$$D1*\operatorname{Tan}(\alpha 1)+L*\operatorname{Tan}(\operatorname{Sin}-1(N*\operatorname{Sin}(\alpha 1)))=A1+\delta 1 \quad (3)$$

$$D2*\operatorname{Tan}(\alpha 2)+L*\operatorname{Tan}(\operatorname{Sin}-1(N*\operatorname{Sin}(\alpha 2)))=A2+\delta 2 \quad (4)$$

Figure 3:
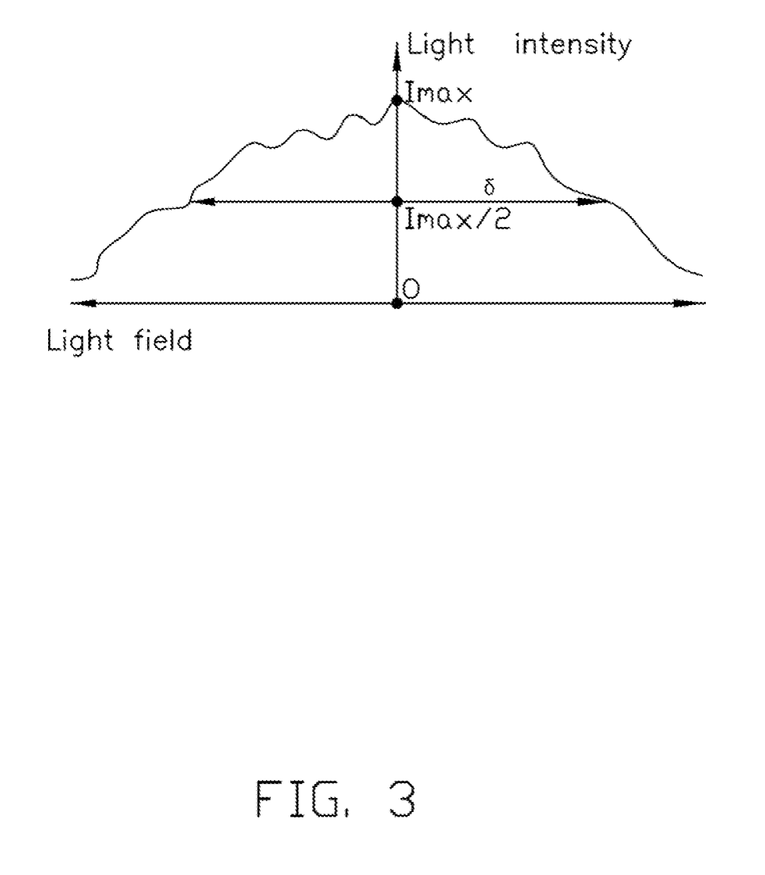
FIG. 3 is a diagrammatic diagram of the light field of the light emitting device of the first embodiment of the present disclosure.

As illustrated in FIG. 3, the parameter δ1 is a half of the highest light intensity Imax of the first light source 31. The parameter δ2 is a half of the highest light intensity Imax of the second light source 32. If the first light source 31 is the same as the second light source 32, the δ1 is equal to the δ2.

In this embodiment, the light emitted from the first light source 31 and the light emitted from the second light source 32 respectively enters along the first axis L1 of the first light concentrating portion 21 and the second axis L2 of the second light concentrating portion 22 to gather to form the light spot C. So the light spot C has a highest light intensity.

Figure 4:
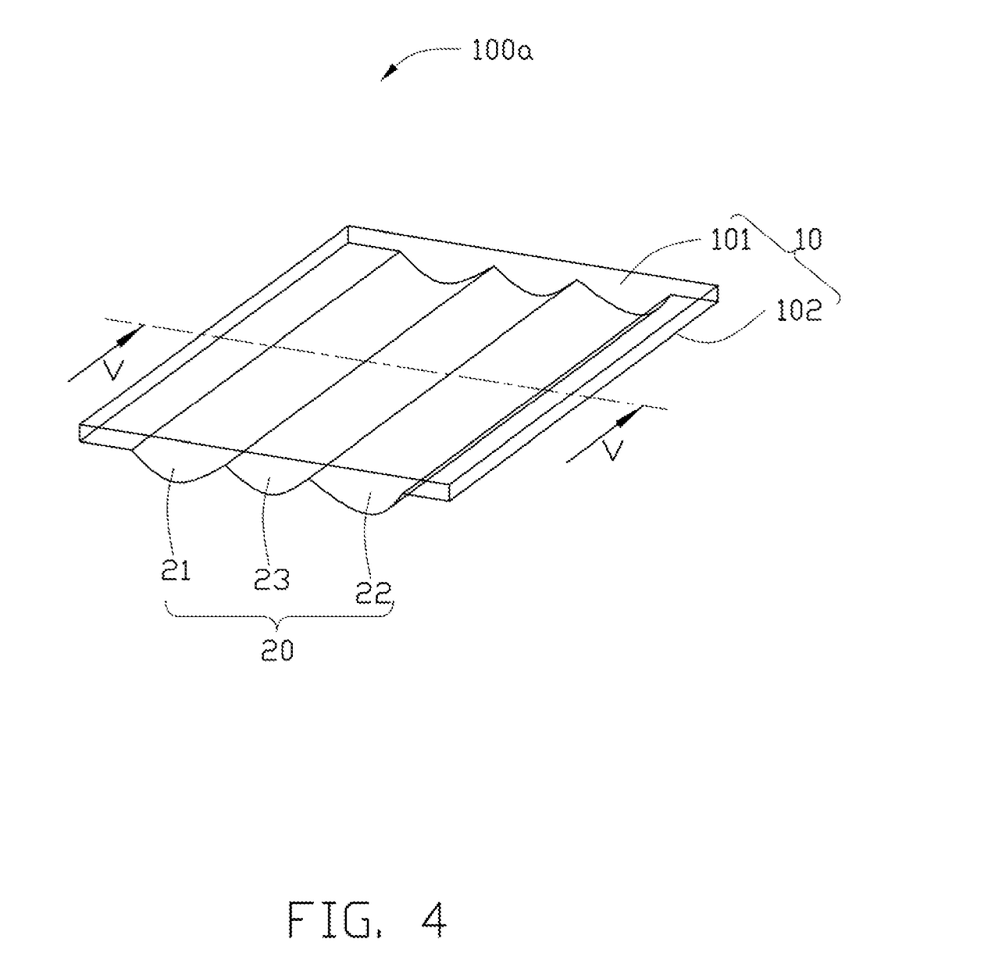
FIG. 4 is an isometric view of a lens of a second embodiment of the present disclosure.

As illustrated in FIG. 4, a lens 100a of a second embodiment is illustrated. The light concentrating portion 20 further includes a third light concentrating portion 23 located between the first light concentrating portion 21 and the second light concentrating portion 22.

Figure 5:
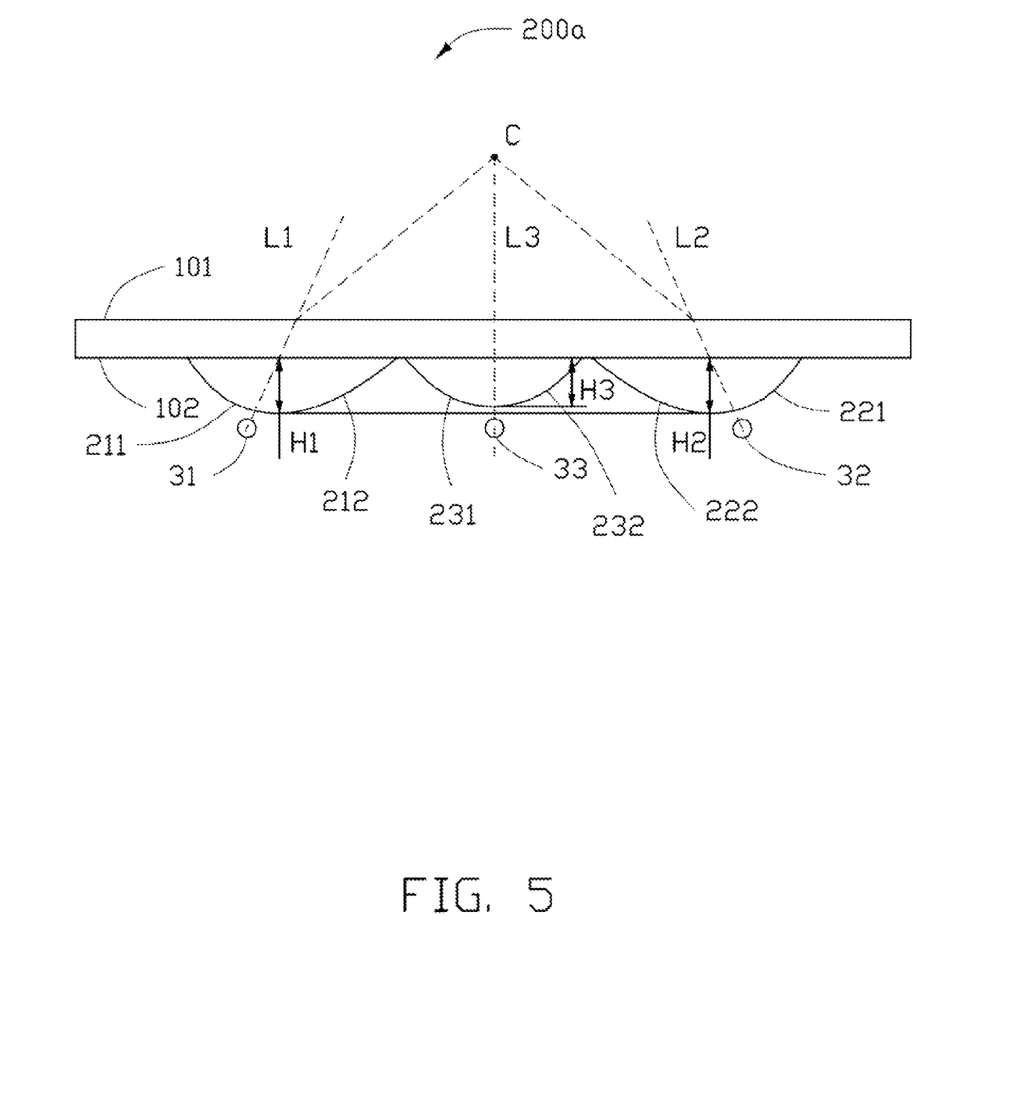
FIG. 5 is a diagrammatic view of a light emitting device having the lens of a second embodiment, and the lens is broken taken along V-V line of FIG. 4.

As illustrated in FIG. 5, the third light concentrating portion 23 has a third axis L3. A vertical distance between the top end of the first light concentrating portion 21 and the second side 102 of the substrate 10 is H1. A vertical distance between the second light concentrating portion 22 and the second side 102 of the substrate 10 is H2. A vertical distance between the top end of the third light concentrating portion 23 and the second side 102 of the substrate 10 is H3. The H3 is respectively less than the H1 and H2.

The third light concentrating portion 23 includes a first curved surface 231 and a second curved surface 232 respectively located at both side of the third axis L3. The first curved surface 231 and the second curved surface 232 is symmetry about the third axis L3.

A light emitting device 200a having the lens 100a of a second embodiment further includes third light source 33. The third light source 33 located below the second side 102 of the substrate 10 and at the third axis L3.

In the illustrated embodiment, The light emitted from the first light source 31, the light emitted from the second light source 32 and the light emitted from the third light source 33 respectively enters the lens 100a along the first axis L1 of the first light concentrating portion 21, the second axis L2 of the second light concentrating portion 22 and the third axis L3 of the third light concentrating portion 23 to gather to form the light spot C. The light spot C has a biggest light intensity.

Figure 6:
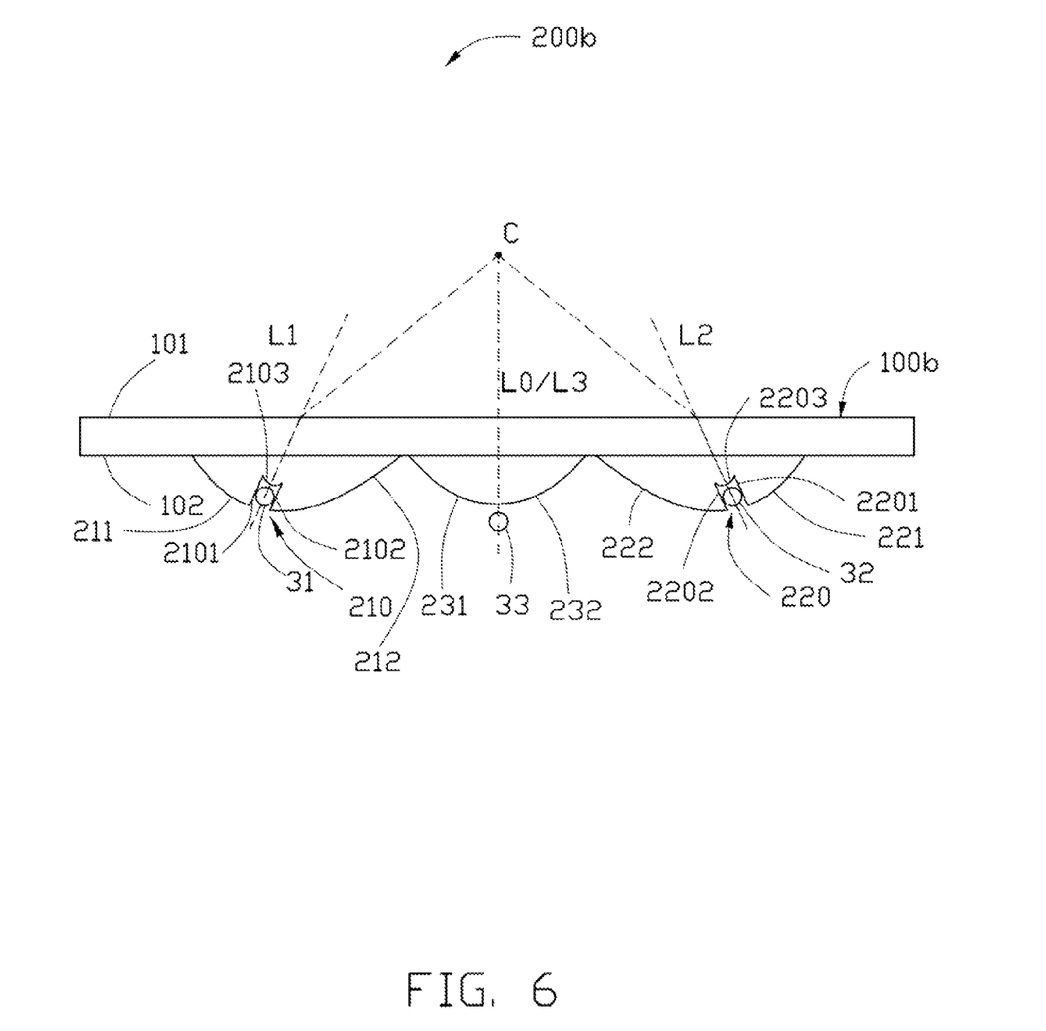
FIG. 6 is a diagrammatic view of a light emitting device having a lens of a third embodiment of the present disclosure.

FIG. 6 illustrates a light emitting device 200b having a lens 100b of a third embodiment. A first groove 210 is formed on the first light concentrating portion 21 and at the first axis L1. A second groove 220 is formed on the second light concentrating portion 22 and at the second axis L2. The first groove 210 receives the first light source 31 therein. The second groove 220 receives the second light source 32 therein.

Specifically, the first groove 210 is surrounded by a first side wall 2101, a second side wall 2102 and a first bottom wall 2103 connecting with the first side wall 2101 and the second side wall 2102. The first side wall 2101 and the second side wall 2102 are parallel with the first axis L1 and can reflect light. The first bottom wall 2103 is convex toward the opening of the first groove 210 to gather light. The first bottom wall 2103 can gather the light to enter the first light concentrating portion 21 along the first axis L1.

The second groove 220 is surrounded by a first side wall 2201, a second side wall 2202 and a second bottom wall 2203 connecting with the first side wall 2201 and the second side wall 2202. The first side wall 2201 and the second side wall 2202 are parallel with the second axis L2 and can reflect light. The second bottom wall 223 is convex toward the opening of the second groove 220 to gather light. The second bottom wall 2203 can gather the light to enter the second concentrating portion 22 along the second axis L2.

Figure 7:
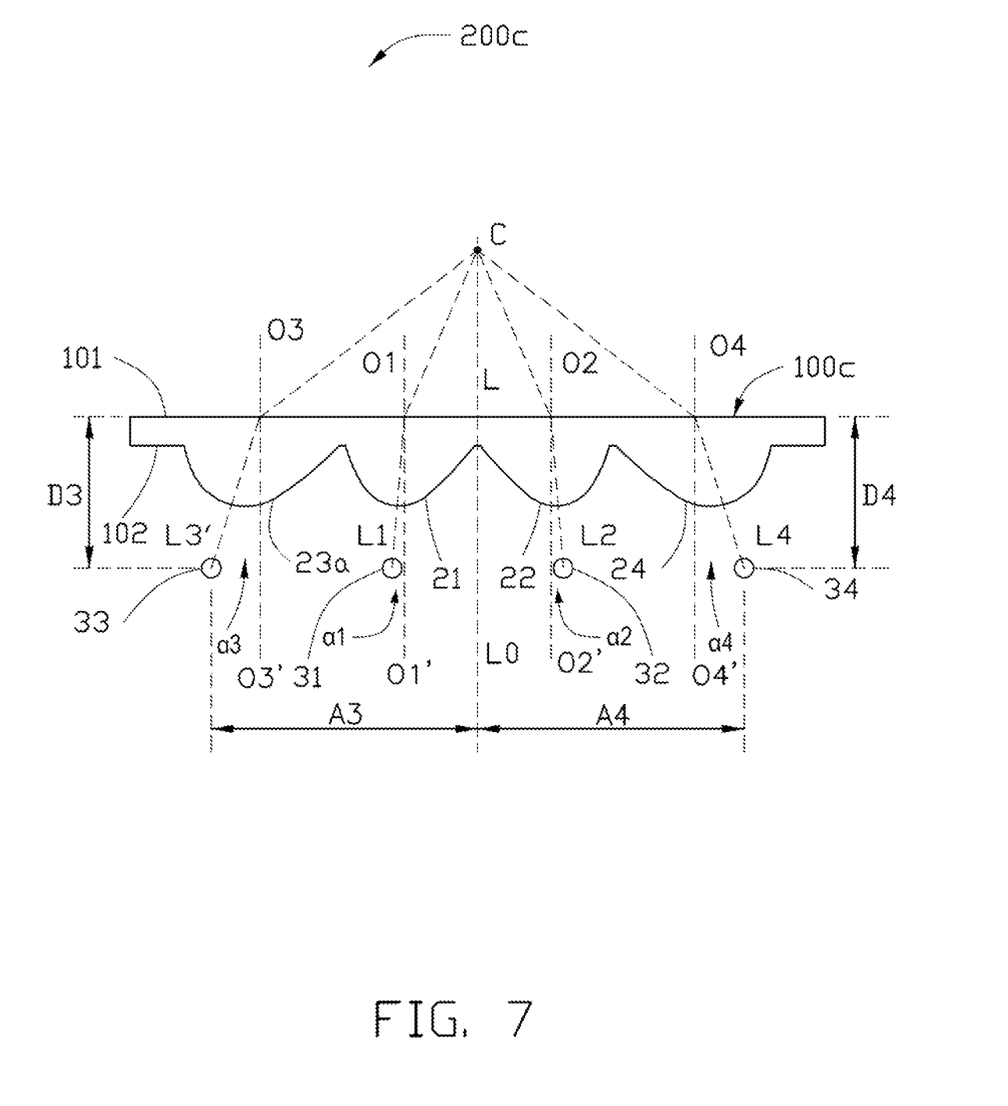
FIG. 7 is a diagrammatic view of a light emitting device having a lens of a fourth embodiment of the present disclosure.

As illustrated in FIG. 7, a lens 100c of a fourth embodiment is similar to the lens 100 of the first embodiment. Further, the lens 100c includes a third light concentrating portion 23a and a fourth light concentrating portion 24. The third light concentrating portion 23a is located at a side of the first light concentrating portion 21 away from the second light concentrating portion 22. The fourth light concentrating portion 24 is located at a side of the second light concentrating portion 22 away from the first light concentrating portion 21. The third light concentrating portion 23a has a third axis L3'. The fourth light concentrating portion 24 has a fourth axis L4. The third axis L3' and the fourth axis L4 intersect at an extending direction thereof.

An angle α3 is defined between the third axis L3' and a line O3-O3' perpendicularly to the first side 101 of the substrate 10. An angle α4 is defined between the fourth axis L4 and a line O4-O4' perpendicularly to the first side 101 of the substrate 10. The angle α3 is more than the angle α1, the angle α4 is more than the angle α2.

A light emitting device 200c having the lens 100c of a fourth embodiment includes a third light source 33 and a fourth light source 34. The third light source 33 is corresponding to the third concentrating portion 23a and at the third axis L3'. The fourth light source 34 is corresponding to the fourth light concentrating portion 24 and at the fourth axis L4. In the illustrated embodiment, the luminescence center of the third light source 33 is at the third axis L3'. The luminescence center of the fourth light source 34 is at the fourth axis L4. The light emitted from the first light source 31, the second light source 32, the third light source 33 and the fourth light source 34 enters the lens 100c to gather to form the light spot C above the first side 101 of the substrate 10. The light spot C has highest a light intensity.

As similar to the lens 100 of the first embodiment of FIG. 2, a vertical distance between the luminescence center of the third light source 33 and the first side 101 of the substrate 10 is D3. A vertical distance between the luminescence center of the fourth light source 34 and the first side 101 of the substrate 10 is D4. A vertical distance between the luminescence center of the third light source 33a and the line L0 is A3. A vertical distance between the luminescence center of the fourth light source 34 and the line L0 is A4. A vertical distance between the center of the light spot C and the first side 101 of the substrate 10 is L. The reflective index of the lens 100c is N. So light enters the lens 100c along the first axis L1, the second axis L2, the third axis L3' and the fourth axis L4 satisfies the following relations:

$$D1*\mathrm{Tan}(\alpha 1)+L*\mathrm{Tan}(\mathrm{Sin}{-}1(N*\mathrm{Sin}(\alpha 1)))=A1 \quad (5)$$

$$D2*\mathrm{Tan}(\alpha 2)+L*\mathrm{Tan}(\mathrm{Sin}{-}1(N*\mathrm{Sin}(\alpha 2)))=A2 \quad (6)$$

$$D3*\mathrm{Tan}(\alpha 3)+L*\mathrm{Tan}(\mathrm{Sin}{-}1(N*\mathrm{Sin}(\alpha 3)))=A3 \quad (7)$$

$$D4*\mathrm{Tan}(\alpha 4)+L*\mathrm{Tan}(\mathrm{Sin}{-}1(N*\mathrm{Sin}(\alpha 4)))=A4 \quad (8)$$

According to above equation (6) (7) (8), the n light concentrating portion satisfies the following relations:

$$Dn*\mathrm{Tan}(\alpha n)+L*\mathrm{Tan}(\mathrm{Sin}{-}1(N*\mathrm{Sin}(\alpha n)))=An \quad (9)$$

The αn is defined between the n axis of the n light concentrating portion and the a imaginary line On-On' perpendicularly to the first side 101 of the substrate 10. A vertical distance defined between the luminescence center of the n light source is Dn. A vertical distance defined between the luminescence center of the n light source and the line L0 is An. A parameter δ can be introduced in the equation (9) as following:

$$Dn*\mathrm{Tan}(\alpha n)+L*\mathrm{Tan}(\mathrm{Sin}^{-1}(N*\mathrm{Sin}(\alpha n)))=An+\delta n \quad (10)$$

The n is natural numbers. The δn is a half of the biggest light intensity of the n light source.

Figure 8:
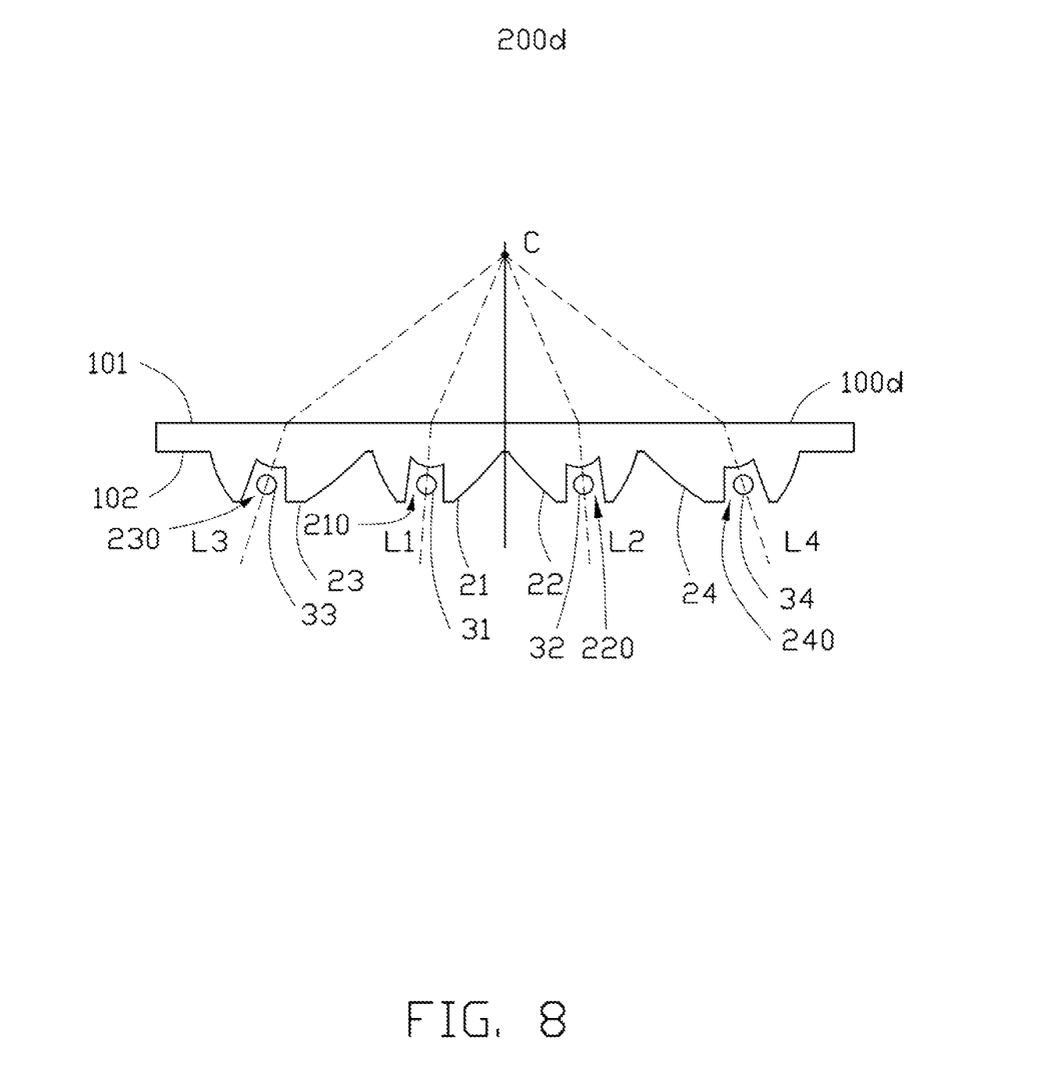
FIG. 8 is a diagrammatic view of a light emitting device having a lens of a fifth embodiment of the present disclosure.

As illustrated in FIG. 8, a lens 100d of a fifth embodiment is showed. The first groove 210 is formed on the first light concentrating portion 21 to receive the first light source 31 therein. The second groove 220 is formed on the second light concentrating portion 22 to receive the second light source 32. The third groove 230 is formed on the third light concentrating portion 23a to receive the third light source 33 therein. The fourth groove is formed on the fourth light concentrating portion 24 to receive the fourth light source 34 therein.

The light emitted from the first light source 31, the second light source 32, the third light source 33 and the fourth light source 34 respectively enters the first light concentrating portion 21, the second light concentration portion 22, the third light concentration 23a, and the fourth light concentrating portion 24 respectively along the first axis L1, the second axis L2, the third axis L3' and the fourth axis L4, such that the light is gathered to form the light spot C above the first side of the substrate 10 of the lens 100d.

Figure 9:
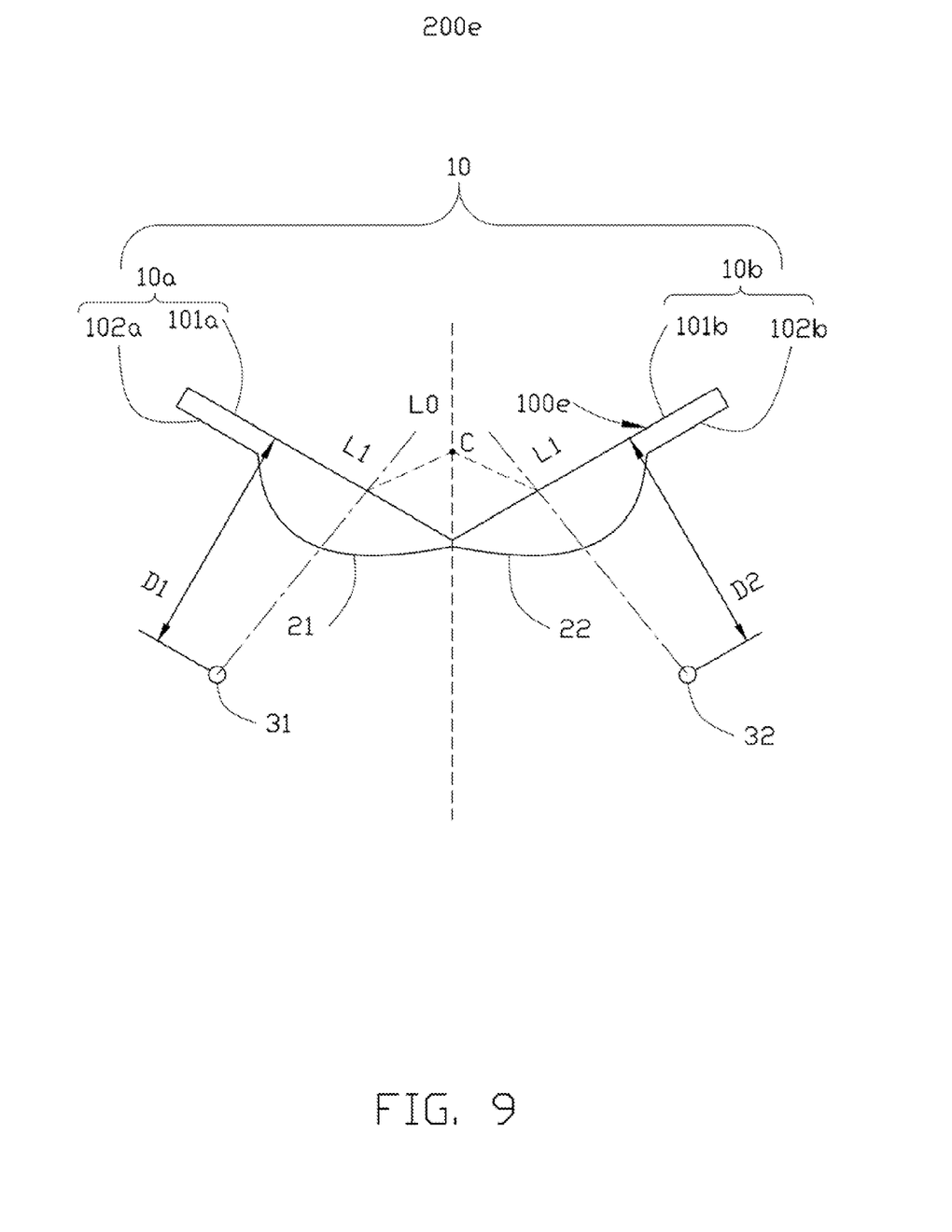
FIG. 9 is a diagrammatic view of a light emitting device having a lens of a sixth embodiment of the present disclosure.

As illustrated in FIG. 9, a lens 100e of a sixth embodiment is illustrated. The substrate 10 of the lens 100e includes a first substrate 10a, a second substrate 10b, the first concentrating portion 21 extending outward from the first substrate 10a, and the second concentrating portion 22 extending outward from the second substrate 10b.

The first substrate 10a includes a first side 101a and a second side 102a located opposite at the first side 101a. The first concentrating portion 21 extending away from the second side 102a of the first substrate 10a. The second substrate 10b includes a first side 101b and a second side 102b located opposite at the first side 101b. The second light concentrating portion 22 extends away from the second side 102b of the second substrate 10b. An angle θ is defined between the first substrate 10a and the second substrate 10b. In this embodiment, the angle θ is equal to or smaller than 180°.

A light emitting device 200e having the lens 100e of the sixth embodiment includes the first light source 31 corresponding to the first light concentrating portion 21 and the second light source 32 corresponding to the second concentrating portion 22. The luminescence center of the first light source 31 is at the first axis L1, the luminescence center of the second light source 32 is at the second axis L2.

The light emitted from the first light source 31 and the light emitted from the second light source 32 respectively enters the lens 100e along the first axis L1 of the first light concentrating portion 21 and the second axis L2 of the second light concentrating portion 22 to gather to form the light spot C. The light spot C has highest light intensity.

The embodiments shown and described above are only examples. Many details are often found in the art such as the other features of a lens and a light emitting device having the same. Therefore, many such details are neither shown nor described. Even though numerous characteristics and advantages of the present technology have been set forth in the foregoing description, together with details of the structure and function of the present disclosure, the disclosure is illustrative only, and changes can be made in the detail, including in matters of shape, size and arrangement of the parts within the principles of the present disclosure up to, and including the full extent established by the broad general meaning of the terms used in the claims. It will therefore be appreciated that the embodiments described above can be modified within the scope of the claims.

What is claimed is:

1. A lens comprising:
   a substrate including a first substrate and a second substrate;
   a light concentrating portion mounted on the substrate and including a first light concentrating portion extending outwardly from the first substrate and a second light concentrating portion extending outwardly from the second substrate; and
   wherein the first light concentrating portion has a first axis, the second light concentrating portion has a second axis, and the first axis and the second axis are configured in an angle and intersect in an extending direction thereof;
   wherein a first groove is defined on the first concentrating portion at the first axis, the first groove is surrounded by a first side wall, a second side wall and a first bottom wall connecting with the first side wall and the second side wall, the first side wall and the second side wall are parallel with the first axis and can reflect light, the first bottom wall has distances away from the substrate and those distances are convexed.

2. The lens of claim 1, wherein an angle is defined between the first substrate and the second substrate.

3. The lens of claim 2, wherein the angle defined between the first substrate and the second substrate is 180°.

4. The lens of claim 3, wherein a second groove is defined on the second concentrating portion along the second axis.

5. The lens of claim 4, wherein the second groove is surrounded by a first side wall, a second side wall and a second bottom wall connecting with the first side wall and the second side wall, the first side wall and the second side wall are parallel with the second axis and can reflect light, the second bottom wall is convex toward a opening of the second groove to gather light.

6. The lens of claim 4, wherein further including a third light concentrating, the third light concentrating portion located between the first light concentrating portion and the second light concentrating portion, the third light concentrating portion has a third axis, the third axis intersects with the first axis and the second axis at an extending direction.

7. A light emitting device, comprising:
   a substrate;
   a light concentrating portion mounted on the substrate;
   a light source corresponding to the light concentrating portion;
   wherein the light concentrating portion includes a first light concentrating portion and a second concerting portion mounted on a side of the substrate, the light source includes a first light source corresponding to the first light concentrating portion and a second light source corresponding to the second light concentrating portion, and
   wherein the first light concentrating portion has a first axis, the second light concentrating portion has a second axis, the first axis and the second axis are configured in an angle and intersect in an extending direction thereof, a first groove is defined on the first concentrating portion at the first axis, the first groove is surrounded by a first side wall, a second side wall and a first bottom wall connecting with the first side wall and the second side wall, the first side wall and the second side wall are parallel with the first axis and can reflect light, the first bottom wall has distances away from the substrate and those distances are convexed.

8. The light emitting device of claim 7, wherein a second groove is defined on the second concentrating portion along the second axis.

9. The light emitting device of claim 8, wherein the second groove is surrounded by a first side wall, a second side wall and a second bottom wall connecting with the first side wall and the second side wall, the first side wall and the second side wall are parallel with the second axis and can reflect light, the second bottom wall is convex toward an opening of the second groove to gather light.

10. The light emitting device of claim 8, wherein the light source is received in the first groove and the second groove.

11. The light emitting device of claim 7, wherein further including a third light concentrating, the third light concentrating portion located between the first light concentrating portion and the second light concentrating portion, the third light concentrating portion has a third axis, the third axis intersects with the first axis and the second axis at an extending direction.

12. A light emitting device, comprising:
   a lens comprising:
      a substrate including a first side and a second side located opposite to the first side;
      a first concentrating portion having a first axis;
      a second light concentrating portion having a second axis;
      a first groove defined on the first concentrating portion and at the first axis;
      a second groove defined on the second concentrating portion and at the second axis;
   a first light source received in the first groove;
   a second light source received in the second groove;
   the firs axis of the first concentrating portion and an imaginary line perpendicularly to the first side of the substrate define a angle $\alpha 1$, the second axis and a imaginary line perpendicularly to the second side of the substrate define an angle $\alpha 2$; light emitted from the first light source and the second light source along the first axis and the second axis axis is through the lens and gathers to form a light spot C above the first side; a vertical distance between a luminescence center of the first light source and the first side of the substrate is D1; a vertical distance defined between the luminescence center of the second light source and the first side of the substrate is D2; a line L0 is defined through a center light spot C and perpendicularly to the first side of the substrate; a vertical distance between the luminescence center of the first light source and the line L0 is A1; a vertical distance between the luminescence center of the second light source and the line L0 is A2; a vertical distance between the center of the light spot C and the first side of the substrate is L; the reflective index of the lens is N; so light emitted from the first light source along the first axis and light emitted from the second light source along the second axis satisfies the following relations:

$$D1*\mathrm{Tan}(\alpha 1)+L*\mathrm{Tan}(\mathrm{Sin}-1(N*\mathrm{Sin}(\alpha 1)))=A1$$

$$D2*\mathrm{Tan}(\alpha 2)+L*\mathrm{Tan}(\mathrm{Sin}-1(N*\mathrm{Sin}(\alpha 2)))=A2.$$

* * * * *